US009832422B2

(12) United States Patent
Krishnan et al.

(10) Patent No.: US 9,832,422 B2
(45) Date of Patent: Nov. 28, 2017

(54) SELECTIVE RECORDING OF HIGH QUALITY MEDIA IN A VIDEOCONFERENCE

(71) Applicant: Avaya Inc., Basking Ridge, NJ (US)

(72) Inventors: Parameshwaran Krishnan, Basking Ridge, NJ (US); Navjot Singh, Somerset, NJ (US); Sreenidhy Sreepathy, Atlanta, GA (US)

(73) Assignee: Avaya Inc., Basking Ridge, NJ (US)

( * ) Notice: Subject to any disclaimer, the term of this patent is extended or adjusted under 35 U.S.C. 154(b) by 761 days.

(21) Appl. No.: 14/059,602

(22) Filed: Oct. 22, 2013

(65) Prior Publication Data

US 2015/0109403 A1  Apr. 23, 2015

(51) Int. Cl.
*H04N 7/15* (2006.01)
*H04N 7/14* (2006.01)

(52) U.S. Cl.
CPC ............ *H04N 7/147* (2013.01); *H04N 7/152* (2013.01); *H04N 7/155* (2013.01)

(58) Field of Classification Search
CPC combination set(s) only.
See application file for complete search history.

(56) References Cited

U.S. PATENT DOCUMENTS

| 8,630,168 B2 * | 1/2014 | Stephens | H04W 74/02 370/230 |
|---|---|---|---|
| 2006/0139463 A1 * | 6/2006 | Heinonen | H04N 5/2251 348/239 |
| 2012/0236111 A1 * | 9/2012 | Halavy | H04N 7/152 348/14.09 |
| 2013/0290493 A1 * | 10/2013 | Oyman | H04B 7/0486 709/219 |
| 2014/0085501 A1 * | 3/2014 | Tran | H04N 5/23238 348/222.1 |
| 2014/0156863 A1 * | 6/2014 | Gao | H04L 65/4084 709/231 |
| 2014/0215085 A1 * | 7/2014 | Li | H04L 65/4084 709/231 |
| 2014/0258463 A1 * | 9/2014 | Winterrowd | H04L 65/4084 709/219 |

* cited by examiner

Primary Examiner — Joseph J Nguyen

(57) ABSTRACT

Embodiments disclosed herein provide systems and methods for selectively recording high quality media in a videoconference. In a particular embodiment, a method provides receiving a plurality of video streams from a plurality of videoconferencing clients. The method further provides streaming video at a first quality level for the plurality of video streams to a first videoconferencing client of the plurality of video conferencing clients. At a first point in time while streaming the video, the method provides identifying a first video stream of the plurality of video streams that should be recorded at a higher quality level than the first quality level and recording the first video stream at the higher quality level from the first point in time.

20 Claims, 10 Drawing Sheets

SELECTIVE RECORDING OF HIGH QUALITY MEDIA IN A VIDEOCONFERENCE

TECHNICAL BACKGROUND

Videoconferencing allows multiple users in different physical locations to participate in a teleconference while being able to see each other. A videoconferencing system will receive video streams from videoconferencing clients participating in a particular videoconference. The videoconferencing system then transfers the video received from each one of the clients to the other clients. Thus, a party on a videoconferencing client is able to view parties on one or more other videoconferencing clients in real time.

Even if the videoconferencing system is able to receive video from each client at a high level of quality, videoconferencing system may not transfer the video to other clients at that high quality. This issue may be due to bandwidth limitations, client device resolution limitations, combination with other video streams, or any other reason that lower quality video may be transferred to a client device. Lower quality video may prevent a party at a receiving client device from viewing the video in as much detail as would otherwise be desired.

Overview

Embodiments disclosed herein provide systems and methods for selectively recording high quality media in a videoconference. In a particular embodiment, a method provides receiving a plurality of video streams from a plurality of videoconferencing clients. The method further provides streaming video at a first quality level for the plurality of video streams to a first videoconferencing client of the plurality of video conferencing clients. At a first point in time while streaming the video, the method provides identifying a first video stream of the plurality of video streams that should be recorded at a higher quality level than the first quality level and recording the first video stream at the higher quality level from the first point in time.

In another embodiment, a videoconferencing system is provided that includes a communication interface configured to receive a plurality of video streams from a plurality of videoconferencing clients and stream video at a first quality level for the plurality of video streams to a first videoconferencing client of the plurality of video conferencing clients. The system further includes a processing system configured to, at a first point in time while streaming the video, identify a first video stream of the plurality of video streams that should be recorded at a higher quality level than the first quality level. The system further includes a storage system configured to record the first video stream at the higher quality level from the first point in time.

In another embodiment, a method of operating a videoconferencing client device is provided. The method includes receiving video streamed from a video conferencing system at a first quality level for a plurality of video streams received by the videoconferencing system from a plurality of videoconferencing clients. The method further includes receiving user input indicating a first point in time from which a first video stream of the plurality of video streams should be recorded at higher quality level than the first quality level. The method further includes transferring an indication of the first point in time to the videoconferencing system, wherein the videoconferencing system records the first video stream at the higher quality level from the first point in time.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
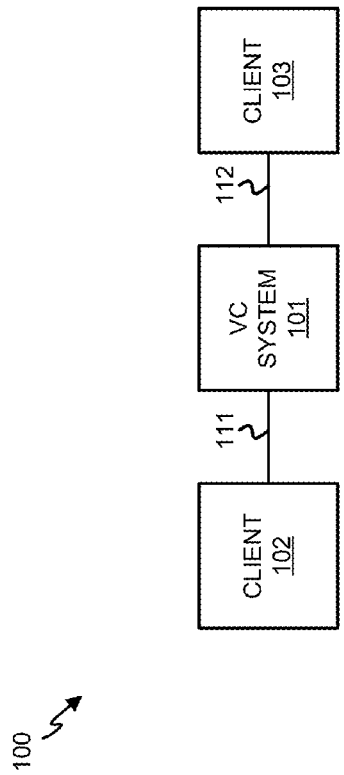
FIG. 1 illustrates a videoconferencing environment for selectively recording high quality media in a videoconference.

FIG. 1 illustrates videoconferencing environment 100. Videoconferencing environment 100 includes videoconferencing system 101, videoconferencing client device 102 and videoconferencing client device 103. Videoconferencing client device 102 and videoconferencing system 101 communicate over communication link 111. Videoconferencing client device 103 and videoconferencing system 101 communicate over communication link 112.

In operation, videoconferencing system 101 provides videoconferencing communications between two or more videoconferencing client devices, such as client devices 102 and 103. The client devices may be dedicated videoconferencing devices or videoconferencing may be one of many functions of a particular client device (e.g. an application executing on a tablet, phone, computer, or other type of device). To facilitate a videoconference, videoconferencing system 101 receives video streamed from each of the client devices and, in real time, streams video to each client device. The video streamed to each client device includes the video streamed from other devices on the videoconference. Accordingly, all parties on the videoconference are able to visually and audibly interact with one another in real time over videoconference system 103.

In many cases, the video streams transferred to the client devices are of lower quality (e.g. lower resolution, lower bitrate, different codec, etc.) than the video streams were when they were received by videoconferencing system 101. The lower quality may be the result of bandwidth limitations on the connection to the client device, resolution limitations of the client device, resolution limitations of combining multiple video streams into a single stream, or for any other reason that lower quality video may be transferred to a client device. Accordingly, if something in a video stream captured by one client device is of interest, the resolution of the video as received at the other clients may be less that desirable for a viewing party.

Figure 2:
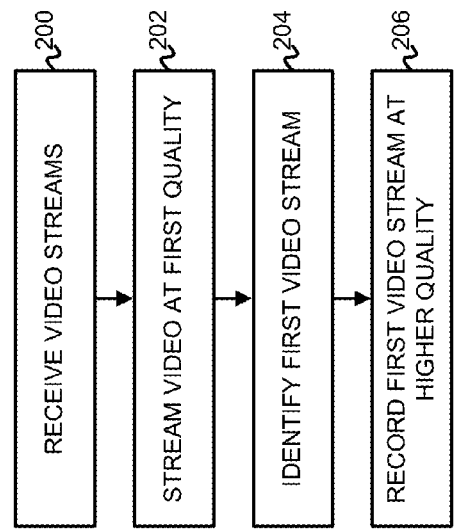
FIG. 2 illustrates an operation of the videoconferencing environment to selectively record high quality media in a videoconference.

FIG. 2 illustrates an operation of videoconferencing environment 100 to selectively record high quality media in a videoconference. Videoconference system 101 receives video streams from video conferencing clients 102 and 103 (step 200). Videoconferencing system 101 streams video at a first quality level to videoconferencing client 102 (step 202). Steps 200 and 202 happen in real time so that video received from one client is streamed to the other in a manner that enables real time communication between parties operating clients 102 and 103. Client 103 may also receive video but for the purposes of this example, only video streamed to client 102 will be discussed. Additionally, since there are only two clients in this videoconference, the video transferred to client 102 may only include the video stream from client 103 or may also include the video stream from client 102 itself, which may allow a party operating client 102 to monitor client 102's video feed.

At a first point in time while streaming the video, videoconferencing system 101 identifies a first video stream of the plurality of video streams that should be recorded at a higher quality level than the first quality level (step 204). In this embodiment, videoconferencing system 101 identifies the video from client 103 as being the video that should be recorded at higher quality. Videoconferencing system 101 may automatically identify the video based on one or more conditions in the video being satisfied or may receive an indication of the video from an operator of client 102 (or client 103 if that client were the focus of this embodiment). Conditions that indicate a particular video should be recorded may include key words spoken in the audio corresponding to the video (e.g. "this next part is important"), the number of people present in the video, an amount of motion in the video, the type of content in the video (e.g. video of a user, a workstation screen share, a demonstration, etc.) or any other factor that may benefit from a higher quality recording—including combinations thereof.

Once the video has been identified, videoconferencing system 101 records the first video stream at the higher quality level from the first point in time (step 206). The higher quality may be a greater resolution than the first quality, may be a better codec than the first quality, may be a different quality level of a single scalable codec (e.g. different bit rate), or any other factor that affects the quality of a video stream—including combinations thereof. The higher quality video may be the video at the quality received by videoconferencing system 101 or some quality less than the quality received by videoconferencing system 101 and greater than the first quality level. In some embodiments, to save incoming bandwidth, videoconferencing system 101 may receive video from client devices at the first quality level until one of the video streams is identified for high quality recording and then videoconferencing system 101 requests the identified video from the source client at the higher quality level. In some embodiments, there may be different levels of higher quality from which videoconferencing system 101 may be able to choose. For example, different conditions discussed above may trigger different quality levels. Likewise, the indication received from the operator of client 102 may indicate one of the multiple quality levels.

Once the higher quality recording has begun, the higher quality recording may continue indefinitely until the videoconference ends, until the one or more conditions are no longer met, until a notification is received from client 102 indicating that the recording should be stopped, until a predetermined maximum amount of storage space is used, until a predetermined amount of time has elapsed, or for some other reason. In one example, videoconferencing system 101 may query the operator of client 102 periodically about whether to continue recording and stop the recording if videoconferencing system 101 does not receive a response to the query.

In some embodiments, client 102 may then receive the recorded higher quality video from videoconferencing system 101. Videoconferencing system 101 may transfer the higher quality video to client 102 in response to a request to stop recording from client 102, automatically upon end of recording or videoconference, or at some other time. Videoconferencing system 101 may transfer the video through the client interface of client 102, via email, or through any other means of transferring data. Upon receiving the video, client 102 is able to display the higher quality video and parties at client 102 are able to view the video at the higher resolution.

Alternatively, in some embodiments, videoconferencing system 101 may store the recorded higher quality video in a shared storage that may be accessed by client 102 or other clients. The shared storage may be local to videoconferencing system 101 or may be on a storage system accessed by videoconferencing system 101 over a communication network(s). To access the stored video, videoconferencing system 101 may transfer access information for the video (e.g. location, filename, etc.) to any clients allowed to view the video and those clients use that information to access the video. The clients themselves may be able to share the access information with others if desired by client operators.

Moreover, videoconferencing system 101 may also change the quality level of the audio associated with each video stream, although, video tends to use more data than audio so audio quality in many embodiments may not be as great of an issue.

Referring back to FIG. 1, client devices 102-103 each comprise wireless and/or wired communication circuitry and processing circuitry. The communication circuitry may include an amplifier, filter, modulator, and signal processing circuitry. The computing devices may also include a user interface, memory device, software, or some other communication components. The computing devices may be a telephone, tablet, computer, e-book, mobile Internet appliance, wireless network interface card, media player, game console, or some other wireless communication apparatus—including combinations thereof.

Videoconferencing system 101 comprises a computer system, a communication interface, and a data storage system. Videoconferencing system 101 may also include other components such as a router, user interface, and power supply. Videoconferencing system 101 may reside in a single server or may be distributed across multiple components.

Communication links 111-112 use metal, glass, air, space, or some other material as the transport media. Communication links 111-112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-112 could be direct links or may include intermediate networks, systems, or devices.

Figure 3:
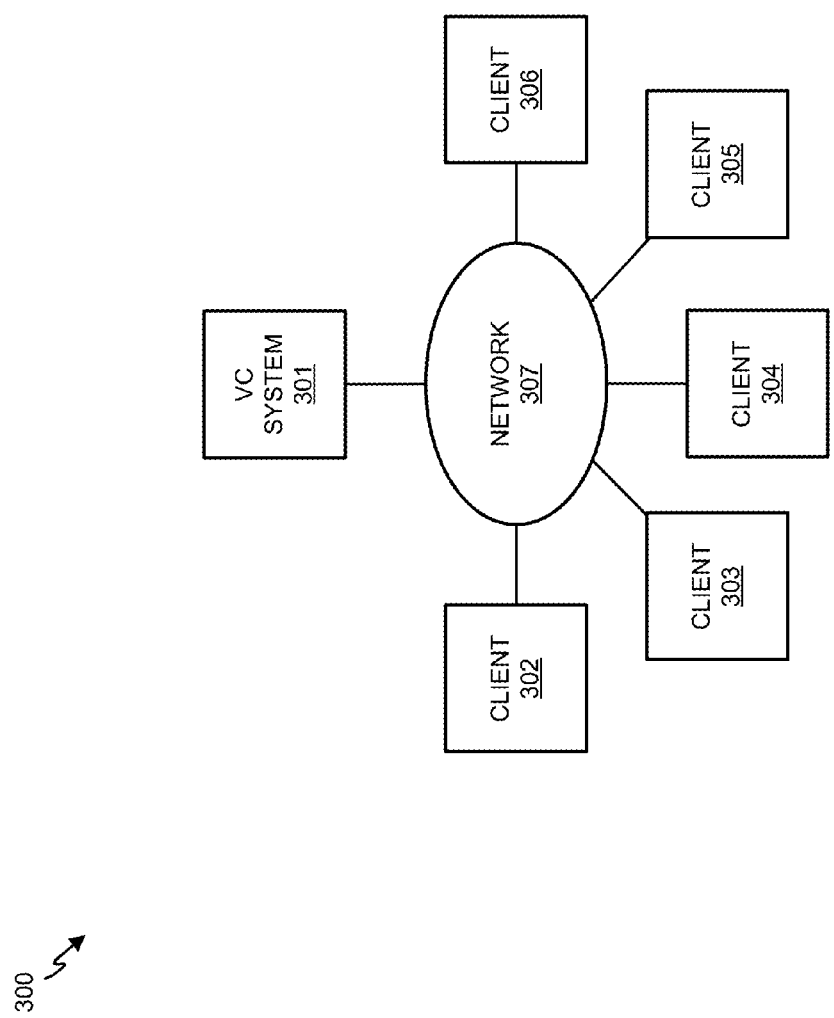
FIG. 3 illustrates a videoconferencing environment for selectively recording high quality media in a videoconference.

FIG. 3 illustrates videoconferencing environment 300. Videoconferencing environment 300 includes videoconferencing system 301, videoconferencing client devices 302-306, and Internet 302. In operation, client devices 302-306 and videoconferencing system 301 communicate over Network 307. Network 307 may be one network or a collection of networks, such as the Internet, a local area network, wide area network, intranet, or otherwise—including combinations thereof.

Figure 4:
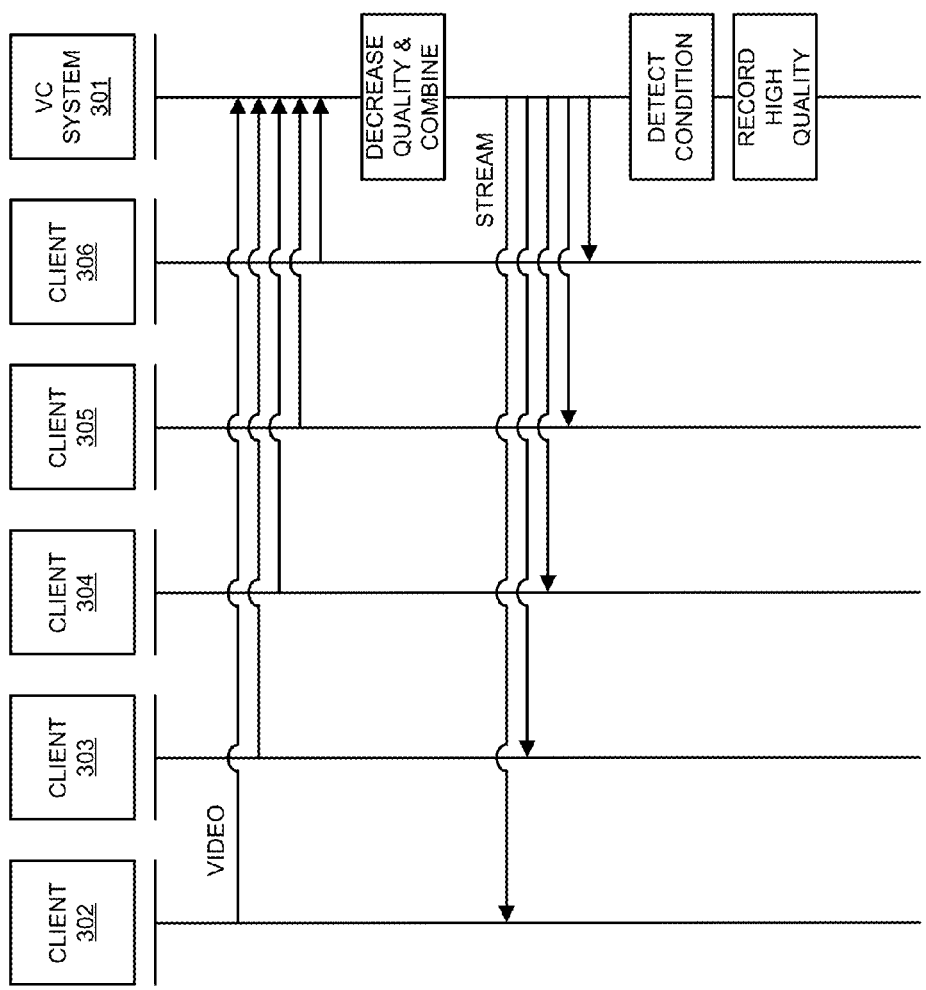
FIG. 4 illustrates an operation of the videoconferencing environment to selectively record high quality media in a videoconference.

FIG. 4 illustrates an operation of videoconferencing environment 100 to selectively record high quality media in a videoconference. After a videoconference is initiated, videoconference system 301 receives video streams from each of client devices 302-306. Upon receiving the streaming video, videoconferencing system 301 decreases the quality of the video and combines the video destined for one client device into a single stream comprising the video from the other four devices. The video may be decreased in quality due to the combination process (i.e. the resolution is lower due to each video making up only a portion of the resolution for the combined video), may be encoded using a different codec or a different level of the same codec, or some other means for reducing the videos quality to save bandwidth—including combinations thereof. It should be understood that, while this embodiment combines the video streams into a single stream, videoconferencing system 301 may transfer the video streams individually to each client device.

The combined video is then transferred to each respective client device in real time to facilitate the real time videoconference communications. While receiving and streaming video for the video conference, videoconferencing system 301 monitors the audio and video of incoming video streams to determine whether a condition has been satisfied that indicates that videoconferencing system 301 should record one of the video streams at high quality. If one or more conditions are satisfied for any one video stream, then video conferencing system 301 records that video at a higher quality level than the quality level currently being streamed to the other clients. The video is recorded from the point in time of the video that the condition is detected. It is possible that videoconferencing system 301 records more than one higher quality video stream at once if more than one video stream satisfies one or more conditions. The one or more conditions may be set by a moderator of the videoconference at one of the client devices and then a notification of such conditions is transferred to videoconferencing system 301. Other methods of providing conditions to videoconferencing system 301 may also be used.

In this embodiment, since videoconferencing system 301 is automatically determining which streams should be recorded at a higher quality level, videoconferencing system 301 may transfer an indication to at least some of client devices 302-306 notifying the devices of the higher quality recording. Upon being notified of the higher quality recording by their respective videoconferencing clients, the operators of client devices 302-306 may be able to request the higher quality video for transfer from videoconferencing system 301. Videoconferencing system 301 may therefore store the higher quality video for a period of time (e.g. three days) and provide the clients with access information allowing the clients to access the video during the period of time.

Figure 5:
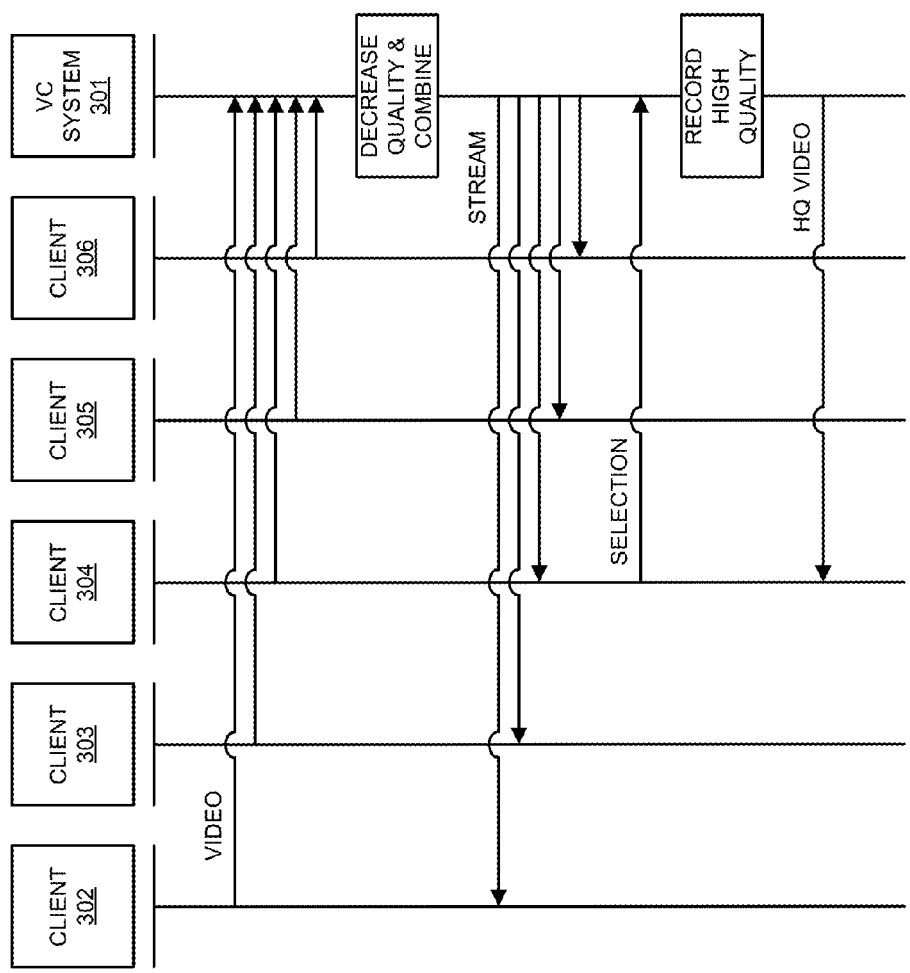
FIG. 5 illustrates an operation of the videoconferencing environment to selectively record high quality media in a videoconference.

FIG. 5 illustrates another operation of videoconferencing environment 100 to selectively record high quality media in a videoconference. In a similar manner to that described above with respect to FIG. 4, during a videoconference, videoconferencing server 301 receives, converts, and transfers video streams from clients 302-306. In this example, videoconferencing system 301 receives a selection notification from client device 304 during the videoconference. The selection indicates a video stream that should be recorded at a higher quality and a point in time of that video stream from which the video stream should be recorded. The point in time may be explicitly indicated in the selection or may be determined as the time when the selection notification is received by videoconferencing system 301.

Upon receiving the selection indicating the time and video stream, videoconferencing system 301 records the selected video stream at a higher quality. Videoconferencing system 301 further makes the higher quality recording available to client device 304. Client device 304 may automatically receive the higher quality video after the high quality video is done recording or the higher quality video may be transferred to client 304 is response to a request from client 304. In some embodiments, client 304 may request that videoconferencing system 301 begin transferring the higher quality video before the higher quality video is done recording.

In some embodiments, client device 304 transfers an indication to videoconferencing system 301 that indicates when videoconferencing system 301 should stop recording the higher quality video. For example, an operator of client device 304 sees something in one of the streams (or anticipates such) that the operator would like to view at higher quality and indicates that a particular stream should be recorded in higher quality at that point in time. Then, when the thing being viewed by the operator is no longer important to the operator, the operator indicates that point in time for the video to stop recording.

Figure 6:
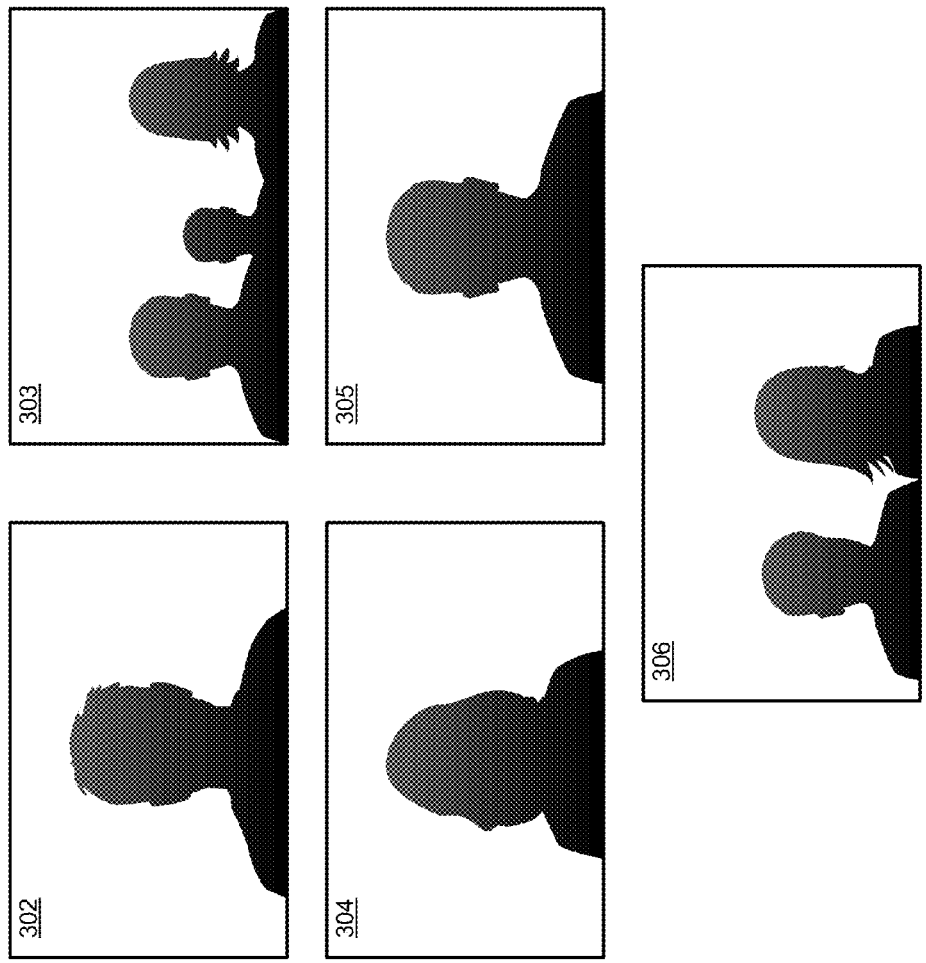
FIG. 6 illustrates incoming video streams in the videoconferencing environment for selectively recording high quality media in a videoconference.

FIG. 6 illustrates incoming video streams 600 received by videoconferencing system 301 in videoconferencing environment 300. Video streams 600 comprise an incoming video stream from each of client devices 302-306. In real time, videoconferencing system 301 lowers the quality of the video streams and streams the lower quality video to the client devices. The lower quality video may be the same quality across all client devices or may be different for each client device. For example, client devices with higher resolution displays and/or faster network connections may receive higher quality video than clients with low-resolution displays or slow network connections.

Figure 7:
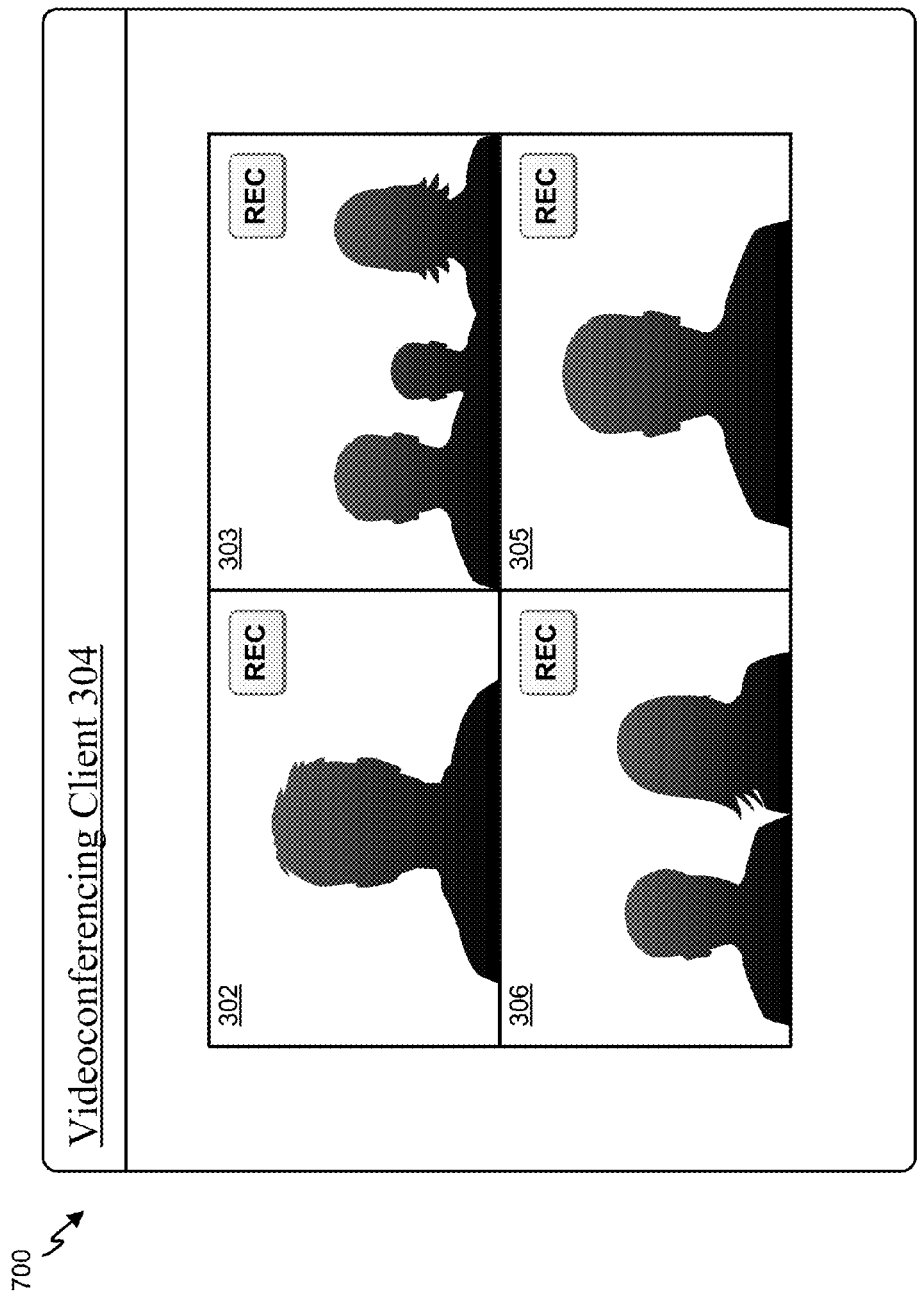
FIG. 7 illustrates displayed lower quality video streams at a client in the videoconferencing environment for selectively recording high quality media in a videoconference.

FIG. 7 illustrates lower quality video streams in videoconferencing window 700 as displayed at client device 304 in the videoconferencing environment. In particular, videoconferencing client 304 presents lower quality video streams from the other videoconferencing clients 302, 303, 305, and 306. In some embodiments, videoconferencing system 301 streams the four videos separately for display at client 304 and, in other embodiments, videoconferencing system 301 combines the video streams into a single video stream so that client 304 displays all four streams as though it is displaying a single video stream.

In the upper right corner of each video stream is a graphical representation of a record button. An operator of client 304 may select the record button when the operator desires a particular stream to be recorded in higher quality. The operator may then press the button again when the operator no longer desires that the higher quality video be recorded. It should be understood that the record buttons in FIG. 7 are exemplary and that other methods of indicating when a video stream should be recorded may also be used.

In some embodiments, since the videoconference is occurring in real time, a part of one of the video streams that the operator of client 304 would like recorded in high quality may have passed or begun before the operator could press the record button. In those embodiments, videoconferencing system 301 may buffer each of the video streams at the higher quality so that the operator of client 304 has time to press record before the higher quality video is lost. The operator of client 304 may then be able to go back in the live stream an amount of time no greater than the capacity of the buffer (e.g. 30 seconds) and indicate that a particular video stream should be recorded from that point. Videoconferencing system 301 then uses the buffered high quality video for the selected stream to record the stream in high quality from the indicated time. In an alternative example, client 304 may be configured to simply include the entire buffered portion of the video stream when the record button is selected for a particular stream.

In some embodiments, videoconferencing system 301 may record all five video streams at higher quality in storage space designated for such purpose or that is not otherwise used, such as scratch space. In response to determining times in which certain video streams should be recorded at higher quality, videoconferencing system 301 pulls the identified portions of the video for availability after the videoconference and discards the rest of the video at the end of the videoconference.

Figure 8:
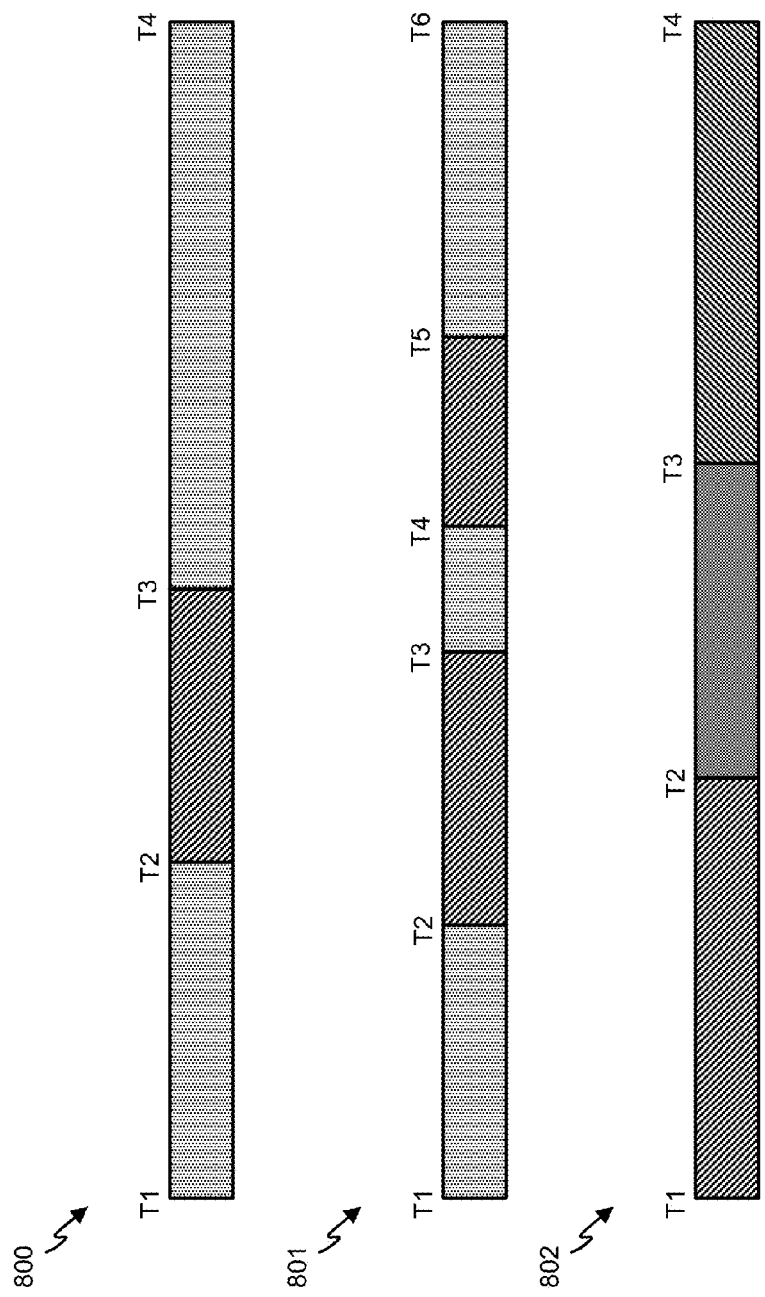
FIG. 8 illustrates timelines in an operation of the videoconferencing environment for selectively recording high quality media in a videoconference.

FIG. 8 illustrates timelines in an operation of videoconferencing environment 300 for selectively recording high quality media in a videoconference. In particular, timeline 800 illustrates four times during a videoconference, T1-T4, for a particular video stream. For consistency with the example from FIG. 7, timeline 800 represents one of the four video streams displayed at client 304. T1 represents the start time of the videoconference. At time T2, it is determined that the video stream should be recorded at a higher quality. This determination may be made by videoconferencing system 301 or upon receiving an indication from client 304 (e.g. via a user selection). Videoconferencing system 301 begins recording the determined video stream at higher quality until time T3 when it is determined that the higher quality recording should stop. The determination of time T3 may be made automatically by videoconferencing system 301 or based on another indication from client 304. The videoconference then ends at time T4. In some embodiments, during the times of the videoconference when videoconferencing system 301 is not recording a higher quality version of the video stream (i.e. T1-T2 and T3-T4), videoconferencing system 301 may record the video stream at a lower quality.

Timeline 801 is a similar timeline to timeline 800 but, instead of one time period of higher quality recording, timeline 801 illustrates two periods of higher quality recording for the video stream. Again, the period for recording may be determined automatically by videoconferencing system 301 or upon receiving an indication from a client device. For example, client 304 may receive user input at time T2 indicating that the video stream from client 302 should be recorded at higher quality and then receives user input at time T3 indicating that the video stream should no longer be recorded. A similar occurrence happens for times T4 and T5, although, the indications for times T4 and T5 may be received from a client other than client 304.

Timeline 802 is an example of what may happen if more than one client device requests that higher quality video of a particular video stream be recorded. Specifically, rather than indicating the start time of the videoconference (although T1 could correspond to the start of the videoconference), time T1 represents a time when client 304 indicates to videoconferencing system 301 that the video stream should be recorded at higher quality. At time T2, videoconferencing system 301 receives an indication from another client device, such as client 306, indicating that the same video stream should be recorded in higher quality from that point in time. In this example, rather than recording two separate instances of the video stream, videoconferencing system 301 notes that time T2 is when client 306 requested higher quality video. At time T3, videoconferencing system 301 receives an indication from client 304 indicating that the higher quality recording should be stopped. However, since client 306 has not indicated the recording should be stopped, videoconferencing system 301 notes time T3 (e.g. stores T3 in memory) from client 304 and continues recording until videoconferencing system 301 receives an indication of time T4 from client 306 indicating that the higher quality recording should be stopped.

Other clients may also request higher quality recording of the video stream at times that include portions of T1-T4. It should therefore be understood that videoconferencing system 301 continues to record the video stream at the higher quality until all clients have indicated that the video stream should no longer be recorded at higher quality.

When done recording the higher quality video, videoconferencing system 301 may provide or make available for provision to clients 304 and 306 higher quality video only recorded within their respective times or may make the full time available to both clients. That is both clients may be able to access the full record time from T1 to T4 or client 304 may only have access to the recording from T1-T3 and client 306 may only have access to the recording from T2-T4. Moreover, the higher quality video may be available to the other clients as well as clients/parties that were unable to join the videoconference. For example, if a user is watching playback of the video at a lower quality at some time after the videoconference has ended, the user may be notified that higher quality video of certain portions are available and the user may choose to watch at least some of those portions in higher quality.

It should be understood that, while the timelines discussed above refer to a video stream from a single client, videoconferencing system 301 may at the same time perform similar recording actions on one or more of the other four video streams received by videoconferencing system 301.

Figure 9:
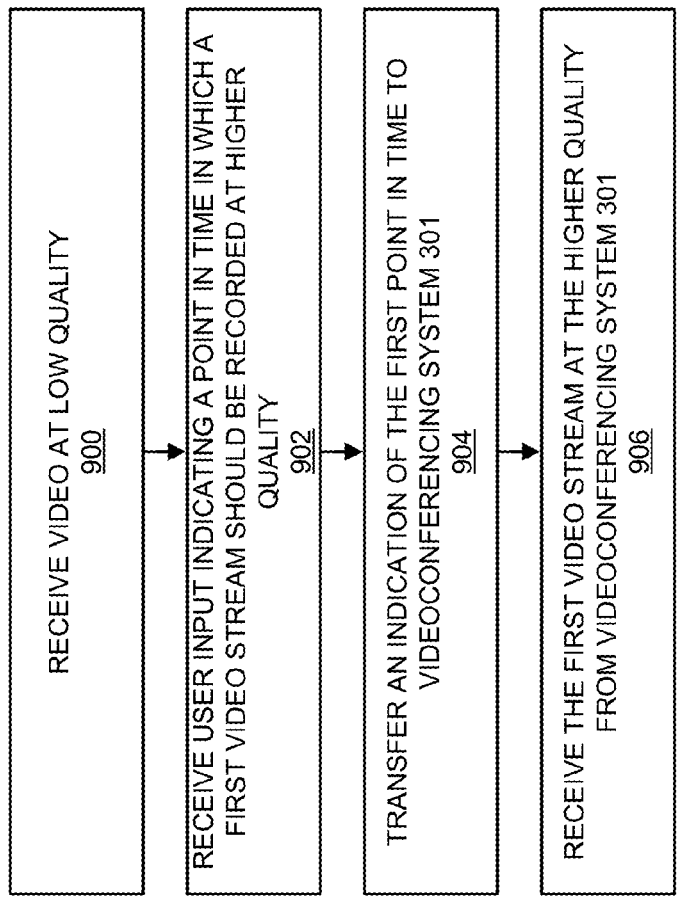
FIG. 9 illustrates an operation of a videoconferencing client to selectively record high quality media in a videoconference.

FIG. 9 illustrates an operation of a videoconferencing client to selectively record high quality media in a videoconference. The videoconferencing client may be one of videoconferencing client devices 302-306. The videoconferencing client receives video streamed from a video conferencing system at a first quality level for a plurality of video streams received by videoconferencing system 301 from a plurality of videoconferencing clients 302-306 (step 900). While the video is streaming, the videoconferencing client receives user input indicating a first point in time from which a first video stream of the plurality of video streams should be recorded at higher quality level than the first quality level (step 902). After receiving the user input, the videoconferencing client transfers an indication of the first point in time to videoconferencing system 301, wherein videoconferencing system 301 records the first video stream at the higher quality level from the first point in time (step 904). The videoconferencing client then receives the first video stream at the higher quality from videoconferencing system 301 (step 906). The higher quality first video stream may be received at a later time, such as a time after the videoconference has ended, or may be received upon videoconferencing system 301 being notified that the higher quality video is desired.

Figure 10:
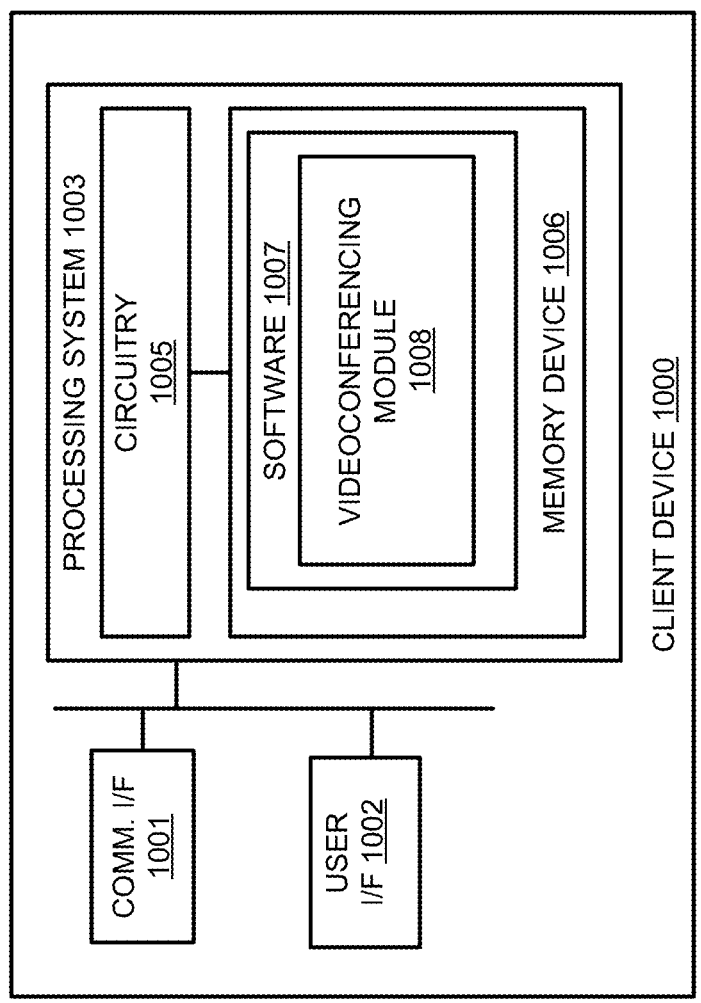
FIG. 10 illustrates a videoconferencing client device for selectively recording high quality media in a videoconference.

FIG. 10 illustrates videoconferencing client device 1000. Client device 1000 is an example of client devices 102 and 103, although devices 102 and 103 could use alternative configurations. Client device 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007. Client device 1000 may include other well-known components such as a battery, power supply, and enclosure that are not shown for clarity. Client device 1000 may be a telephone, computer, tablet, e-book, mobile Internet appliance, media player, game console, or some other communication apparatus—including combinations thereof.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user to receive user inputs and to present media and/or information. User interface 1002 may include a speaker, microphone, camera, buttons, lights, display screen, touch screen, touch pad, scroll wheel, communication port, or some other user input/output apparatus—including combinations thereof.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software includes video conferencing module 1008. Operating software 1007 may further include an operating system, utilities, drivers, network interfaces, applications, or some other type of software. When executed by processing circuitry 1005, operating software 1007 directs processing system 1003 to operate client device 1000 as described herein.

In particular, videoconferencing module 1008 directs processing system 1003 to receive, via communication interface 1001, video streamed from a video conferencing system at a first quality level for a plurality of video streams received by the videoconferencing system from a plurality of videoconferencing clients. Module 1008 further directs processing system 1003 to receive user input, via user interface 1002, indicating a first point in time from which a first video stream of the plurality of video streams should be recorded at higher quality level than the first quality level. Module 1008 then directs processing system 1003 to transfer, via communication interface 1001, an indication of the first point in time to the videoconferencing system, wherein the videoconferencing system records the first video stream at the higher quality level from the first point in time.

Figure 11:
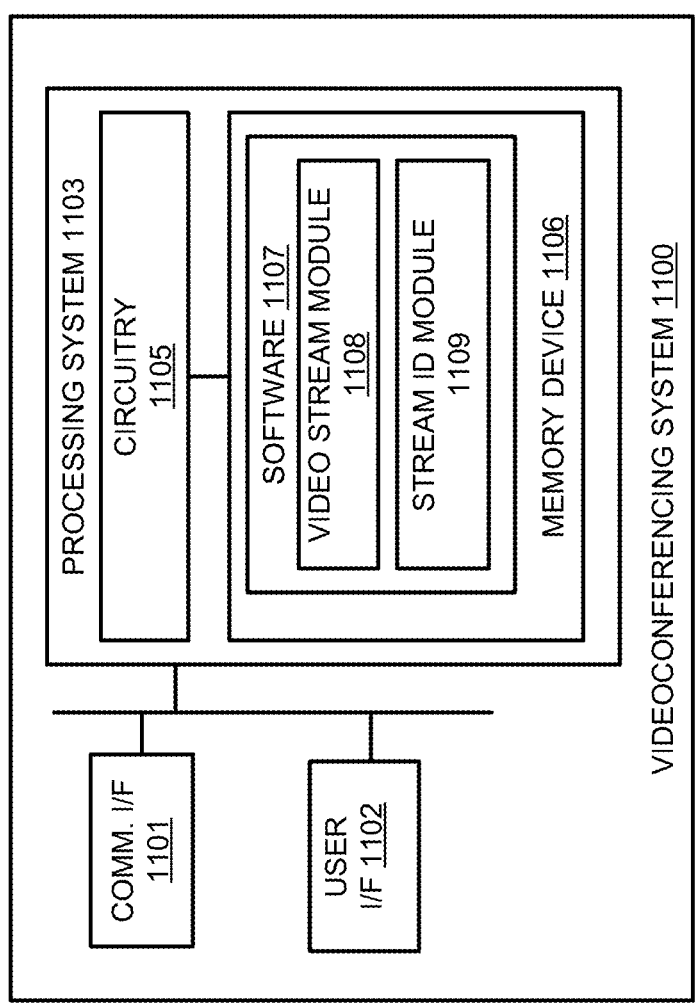
FIG. 11 illustrates a videoconferencing system for selectively recording high quality media in a videoconference.

FIG. 11 illustrates video conferencing system 1100. Videoconferencing system 1100 is an example of videoconferencing system 101, although videoconferencing system 101 may use alternative configurations. Videoconferencing system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user. User interface 1102 may include a keyboard, display screen, mouse, touch pad, or some other user input/output apparatus. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus—including combinations thereof. Operating software 1107 comprises computer programs, firmware, or some other form of machine-readable processing instructions. Operating software 1107 includes video stream module 1108 and video stream identification module 1109. Operating software 1107 may further include an operating system, utilities, drivers, network interfaces, applications, or some other type of software. When executed by circuitry 1105, operating software 1107 directs processing system 1103 to operate videoconferencing system 1100 as described herein.

In particular, video stream module 1108 directs processing system 1103 to receive a plurality of video streams from a plurality of videoconferencing clients and stream video at a first quality level for the plurality of video streams to a first videoconferencing client of the plurality of video conferencing clients. Stream identification module 1109 directs processing system 1103 to, at a first point in time while streaming the video, identifying a first video stream of the plurality of video streams that should be recorded at a higher quality level than the first quality level and directs memory device 1106 to record the first video stream at the higher quality level from the first point in time.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a videoconferencing system, comprising:
    receiving a plurality of video streams from a plurality of videoconferencing clients;
    streaming video at a first quality level for the plurality of video streams to a first videoconferencing client of the plurality of video conferencing clients;
    at a first point in time while streaming the video, identifying a first video stream of the plurality of video streams that should be recorded at a higher quality level than the first quality level; and
    while streaming the video at the first quality level, in the videoconferencing system, recording the first video stream at the higher quality level from the first point in time.

2. The method of claim 1, wherein identifying the first video stream comprises:
    receiving an indication from the first video conferencing client that identifies the first video stream.

3. The method of claim 1, wherein identifying the first video stream comprises:
    determining at least one condition that, when satisfied, indicates that a particular video stream should be recorded at the higher quality level; and
    determining that the first video stream satisfies the at least one condition.

4. The method of claim 1, further comprising:
    buffering the plurality of video streams at the higher quality level; and
    in response to identifying the first video stream, recording at least a portion of the first video stream buffered before the first point in time.

5. The method of claim 1, further comprising:
    identifying a second point in time; and
    stop recording the first video stream at the second point in time.

6. The method of claim 5, wherein identifying the second point in time comprises:
    receiving an indication from the first video conferencing client that identifies the second point in time.

7. The method of claim 1, further comprising:
    transferring the first video stream at the higher quality to the first video conferencing client.

8. The method of claim 1, wherein the first quality level comprises a first video resolution and the higher quality level comprises a video resolution higher than the first video resolution.

9. The method of claim 1, wherein the first quality level comprises a first video codec and the higher quality level comprises a second video codec.

10. A videoconferencing system, comprising:
    a communication interface configured to receive a plurality of video streams from a plurality of videoconferencing clients and stream video at a first quality level for the plurality of video streams to a first videoconferencing client of the plurality of video conferencing clients;
    a processing system configured to, at a first point in time while streaming the video, identify a first video stream of the plurality of video streams that should be recorded at a higher quality level than the first quality level; and
    a storage system configured to record the first video stream at the higher quality level from the first point in time while the communication interface streams the video at the first quality level.

11. The videoconferencing system of claim 10, wherein the processing system configured to identify the first video stream comprises:
    the processing system configured to receive through the communication interface an indication from the first video conferencing client that identifies the first video stream.

12. The videoconferencing system of claim 10, wherein the processing system configured to identify the first video stream comprises:
    the processing system configured to determine at least one condition that, when satisfied, indicates that a particular video stream should be recorded at the higher quality level and determine that the first video stream satisfies the at least one condition.

13. The videoconferencing system of claim 10, further comprising:
    the storage system configured to buffer the plurality of video streams at the higher quality level and, in response to identifying the first video stream, record at least a portion of the first video stream buffered before the first point in time.

14. The videoconferencing system of claim 10, further comprising:
    the processing system configured to identify a second point in time; and
    the storage system configured to stop recording the first video stream at the second point in time.

15. The videoconferencing system of claim 14, wherein the processing system configured to identify the second point in time comprises:
    the processing system configured to receive through the communication interface an indication from the first video conferencing client that identifies the second point in time.

16. The videoconferencing system of claim 10, further comprising:
    the communication interface configured to transfer the first video stream at the higher quality to the first video conferencing client.

17. The videoconferencing system of claim 10, wherein the first quality level comprises a first video resolution and the higher quality level comprises a video resolution higher than the first video resolution.

18. The videoconferencing system of claim 10, wherein the first quality level comprises a first video codec and the higher quality level comprises a second video codec.

19. A method of operating a videoconferencing client comprising:
    receiving video streamed from a video conferencing system at a first quality level for a plurality of video streams received by the videoconferencing system from a plurality of videoconferencing clients;
    receiving user input indicating a first point in time from which a first video stream of the plurality of video streams should be recorded at higher quality level than the first quality level;
    transferring an indication of the first point in time to the videoconferencing system, wherein the videoconferencing system records the first video stream at the higher quality level from the first point in time while streaming the video at the first quality level.

20. The videoconferencing client of claim 19, further comprising:
   receiving the first video stream at the higher quality level from the videoconferencing system.

\* \* \* \* \*